(12) United States Patent
Yang et al.

(10) Patent No.: US 12,506,211 B2
(45) Date of Patent: Dec. 23, 2025

(54) BATTERY PACK AND VEHICLE INCLUDING SAME

(71) Applicant: LG ENERGY SOLUTION, LTD., Seoul (KR)

(72) Inventors: Jin-Oh Yang, Daejeon (KR); Kwang-Keun Oh, Daejeon (KR); In-Hyuk Jung, Daejeon (KR); Hae-Won Choi, Daejeon (KR)

(73) Assignee: LG ENERGY SOLUTION, LTD, Seoul (KR)

( * ) Notice: Subject to any disclaimer, the term of this patent is extended or adjusted under 35 U.S.C. 154(b) by 0 days.

(21) Appl. No.: 18/783,320

(22) Filed: Jul. 24, 2024

(65) Prior Publication Data

US 2024/0380052 A1    Nov. 14, 2024

Related U.S. Application Data

(63) Continuation of application No. 18/646,606, filed on Apr. 25, 2024, which is a continuation of application (Continued)

(30) Foreign Application Priority Data

Jan. 11, 2021 (KR) .......................... 10-2021-0003547

(51) Int. Cl.
*H01M 50/249* (2021.01)
*B60L 50/64* (2019.01)
(Continued)

(52) U.S. Cl.
CPC .......... *H01M 50/249* (2021.01); *B60L 50/64* (2019.02); *H01M 10/613* (2015.04);
(Continued)

(58) Field of Classification Search
CPC ............. H01M 50/249; H01M 50/314; H01M 50/358; H01M 10/613; H01M 10/625;
(Continued)

(56) References Cited

U.S. PATENT DOCUMENTS 10,622,610 B2    4/2020    Seo et al.
10,777,787 B2    9/2020    Reingruber et al.
(Continued)

FOREIGN PATENT DOCUMENTS

CN    1519963 A    8/2004
CN    106207042    12/2016
(Continued)

OTHER PUBLICATIONS

WO 2022067810 Google Translation (Year: 2011).*
(Continued)

*Primary Examiner* — Jimmy Vo
(74) *Attorney, Agent, or Firm* — Bryan Cave Leighton Paisner LLP

(57) ABSTRACT

A battery pack according to an embodiment of the present disclosure includes at least one battery cell including a vent portion configured to force gas out; and a pack case in which the at least one battery cell is accommodated such that the vent portion faces a lower side of the battery pack. The vent portion is exposed from the battery pack.

18 Claims, 10 Drawing Sheets

Related U.S. Application Data

No. 18/010,202, filed as application No. PCT/KR2022/000502 on Jan. 11, 2022.

(51) Int. Cl.

| | | |
|---|---|---|
| *H01M 10/613* | (2014.01) | |
| *H01M 10/625* | (2014.01) | |
| *H01M 10/6551* | (2014.01) | |
| *H01M 10/6556* | (2014.01) | |
| *H01M 10/6567* | (2014.01) | |
| *H01M 50/358* | (2021.01) | |
| *H01M 50/414* | (2021.01) | |

(52) U.S. Cl.
CPC ..... *H01M 10/625* (2015.04); *H01M 10/6551* (2015.04); *H01M 10/6556* (2015.04); *H01M 10/6567* (2015.04); *H01M 50/358* (2021.01); *H01M 50/414* (2021.01); *H01M 2220/20* (2013.01)

(58) Field of Classification Search
CPC ......... H01M 10/6551; H01M 10/6556; H01M 10/6567

See application file for complete search history.

(56) References Cited

U.S. PATENT DOCUMENTS

| | | | |
|---|---|---|---|
| 11,302,972 | B2 | 4/2022 | Chu et al. |
| 2004/0228061 | A1 | 11/2004 | Kim et al. |
| 2009/0061305 | A1 | 3/2009 | Nishida et al. |
| 2010/0112436 | A1 | 5/2010 | Mizuta et al. |
| 2014/0205878 | A1 | 7/2014 | Ohgitani et al. |
| 2016/0099451 | A1* | 4/2016 | Murai ................ H01M 50/509 429/54 |
| 2016/0204404 | A1 | 7/2016 | Shimizu et al. |
| 2018/0316071 | A1 | 11/2018 | Newman et al. |
| 2018/0351219 | A1 | 12/2018 | Smith et al. |
| 2018/0358593 | A1 | 12/2018 | Seo et al. |
| 2019/0067658 | A1 | 2/2019 | Fujiwara et al. |
| 2019/0207184 | A1 | 7/2019 | Koutari et al. |
| 2019/0229384 | A1 | 7/2019 | Tasiopoulos et al. |
| 2019/0334134 | A1* | 10/2019 | Reingruber ......... H01M 10/613 |
| 2020/0083575 | A1 | 3/2020 | Yoo et al. |
| 2020/0194851 | A1 | 6/2020 | Seo et al. |
| 2020/0313129 | A1 | 10/2020 | Koutari et al. |
| 2021/0074971 | A1* | 3/2021 | Kim ................ H01M 50/30 |
| 2021/0328281 | A1 | 10/2021 | Chu et al. |
| 2023/0327284 | A1 | 10/2023 | Godding |

FOREIGN PATENT DOCUMENTS

| | | |
|---|---|---|
| CN | 209592134 U | 11/2019 |
| CN | 111755636 A | 10/2020 |
| CN | 211907633 U | 11/2020 |
| CN | 111755636 B | 9/2021 |
| DE | 102017212223 A1 | 1/2019 |
| EP | 2784869 A1 | 10/2014 |
| JP | 07-030413 A | 7/1995 |
| JP | 2009059474 A | 3/2009 |
| JP | 2013152939 A | 8/2013 |
| JP | 2016062757 A | 4/2016 |
| JP | 2016072171 A | 5/2016 |
| JP | 6056499 B2 | 12/2016 |
| JP | 6212017 B2 | 10/2017 |
| JP | 6256846 B2 | 1/2018 |
| JP | 2019-040851 A | 3/2019 |
| KR | 10-2018-0006150 A | 1/2018 |
| KR | 10-2019-0047513 A | 5/2019 |
| KR | 10-2019-0089121 A | 7/2019 |
| KR | 10-2019-0110782 A | 10/2019 |
| WO | 2013077205 A1 | 5/2013 |
| WO | 2018003290 A1 | 1/2018 |
| WO | 2018003291 A1 | 1/2018 |
| WO | 2020/133659 A1 | 7/2020 |
| WO | 2022043259 A1 | 3/2022 |
| WO | 2022043262 A1 | 3/2022 |
| WO | WO-2022067810 A1 * | 4/2022 ......... H01M 10/613 |

OTHER PUBLICATIONS

International Search Report (with partial translation) and Written Opinion dated Apr. 14, 2022, for corresponding International Patent Application No. PCT/KR2022/000502.

* cited by examiner

BATTERY PACK AND VEHICLE INCLUDING SAME

The present application is a Continuation of U.S. patent application Ser. No. 18/646,606 filed on Apr. 25, 2024, which is a Continuation of U.S. patent application Ser. No. 18/010,202 filed on Dec. 13, 2022, which is the National Stage filing under 35 U.S.C. 371 of International Application No. PCT/KR2022/000502 filed on Jan. 11, 2022, which claims the benefit of Korean Patent Application No. 10-2021-0003547 filed on Jan. 11, 2021 with the Korean Intellectual Property Office, the disclosure of which is incorporated herein by reference in its entirety.

TECHNICAL FIELD

The present disclosure relates to a battery pack and a vehicle comprising the same.

BACKGROUND ART

Due to their characteristics of being easily applicable to various products and electrical properties such as a high energy density, secondary batteries are not only commonly applied to portable devices, but universally applied to electric vehicles (EVs) or hybrid electric vehicle (HEVs) that are driven by an electrical driving source. Such secondary batteries are gaining attention for their primary advantage of remarkably reducing the use of fossil fuels and not generating by-products from the use of energy, making it a new eco-friendly and energy efficient source of energy.

The types of secondary batteries widely used at present include lithium ion batteries, lithium polymer batteries, nickel cadmium batteries, nickel hydrogen batteries, nickel zinc batteries or the like. This unit secondary battery cell, i.e., a unit battery cell has an operating voltage of about 2.5V to 4.5V. Accordingly, when a higher output voltage is required, a plurality of battery cells may be connected in series to fabricate a battery pack. Additionally, the battery pack may be fabricated by connecting the plurality of battery cells in parallel according to the charge/discharge capacity required for the battery pack. Accordingly, the number of battery cells included in the battery pack may be variously set depending on the required output voltage or charge/discharge capacity.

Meanwhile, when fabricating the battery pack by connecting the plurality of battery cells in series/in parallel, it is general to make a battery module including at least one battery cell, and then fabricate a battery pack or a battery rack using at least one battery module with an addition of any other component.

In general, the conventional battery pack case includes a plurality of battery cells, a pack case to accommodate the plurality of battery cells, a pack cover to cover the plurality of battery cells at the upper part of the pack case and a heat sink mounted below the pack case to cool the plurality of battery cells. Here, the conventional pack case includes an assembly of a plurality of plate members to accommodate the plurality of battery cells.

However, in the case of the conventional battery pack, the plurality of plate members that constitute the pack case increases the total size of the battery pack, and thus there is an energy density disadvantage. Additionally, in the case of the conventional battery pack, additional members such as the top cover and the heat sink reduce the total energy density.

Furthermore, when an overheat or fire situation occurs in the conventional battery pack, gas emitting from the battery cells moves to the upper part of the battery pack, which poses a great threat to safety of a driver and passengers located on the battery pack.

Accordingly, it is aimed at providing a battery pack with a more compact structure and increased energy density as well as improved safety performance and a vehicle including the battery pack.

DISCLOSURE

Technical Problem

Accordingly, the present disclosure is directed to providing a battery pack with a more compact structure and increased energy density and a vehicle comprising the same.

Additionally, the present disclosure is further directed to providing a battery pack with improved safety performance and a vehicle comprising the same.

Technical Solution

To solve the above-described problem, the present disclosure provides a battery pack including at least one battery cell including a vent portion to force gas out; and a pack case which accommodates the at least one battery cell such that the vent portion faces a lower side of the battery pack, with the vent portion exposed from the battery pack.

The battery pack may include a pack cover which is coupled to the pack case and covers the at least one battery cell on a side opposite to the vent portion.

The pack cover may have a cooling channel inside to cool the at least one battery cell.

The pack cover may include a bottom heat sink positioned in contact with the at least one battery cell; and a top heat sink coupled to the bottom heat sink to form the cooling channel inside.

The at least one battery cell may be fixed to a lower surface of the bottom heat sink.

The pack cover may include a cooling water inlet port which communicates with the cooling channel, and protrudes from a side of the top heat sink; and a cooling water outlet port which is provided in the top heat sink, spaced apart from the cooling water inlet port, and communicates with the cooling channel.

The pack case may include a case body which covers the at least one battery cell, and is coupled to the pack cover; and a cell insertion portion provided on a bottom of the case body, into which the at least one battery cell is inserted.

The cell insertion portion may have at least one opening through which the vent portion is exposed from the pack case.

The cell insertion portion may protrude to a predetermined height from a lower side of the pack case.

The cell insertion portion may protrude downward below the pack case more than the vent portion.

The cell insertion portion may cover a side of a bottom of the at least one battery cell.

An inner space of the pack case may be filled with a resin material to cover the at least one battery cell.

A plurality of battery cells may be provided, and the resin material may be filled between the plurality of battery cells.

The resin material may include a potting resin.

The vent portion may be provided at an end of a lengthwise direction of the at least one battery cell, and the end of the at least one battery cell may be positioned below the pack case.

The pack cover may cover an opposite end of the at least one battery cell.

Additionally, the present disclosure provides a vehicle including at least one battery pack according to the above-described embodiments.

A lower surface of the pack case may be spaced a predetermined height apart from an under body frame of the vehicle to form a safety space.

The battery pack may include a reinforcing plate mounted in an under body frame of the vehicle.

A lower surface of the pack case may be spaced a predetermined height apart from the reinforcing plate to form a safety space.

Advantageous Effects

According to the various embodiments as described above, it is possible to provide a battery pack with a more compact structure and increased energy density and a vehicle comprising the same.

Additionally, according to the various embodiments as described above, it is possible to provide a battery pack with improved safety performance and a vehicle comprising the same.

DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

BEST MODE

The present disclosure will become apparent by describing a preferred embodiment of the present disclosure in detail with reference to the accompanying drawings. The embodiment described herein is provided by way of illustration to help an understanding of the present disclosure, and it should be understood that various modifications may be made to the present disclosure in other embodiments than the embodiment described herein. Additionally, to help an understanding of the present disclosure, the accompanying drawings are not shown in true scale and may depict some exaggerated elements.

Figure 1:
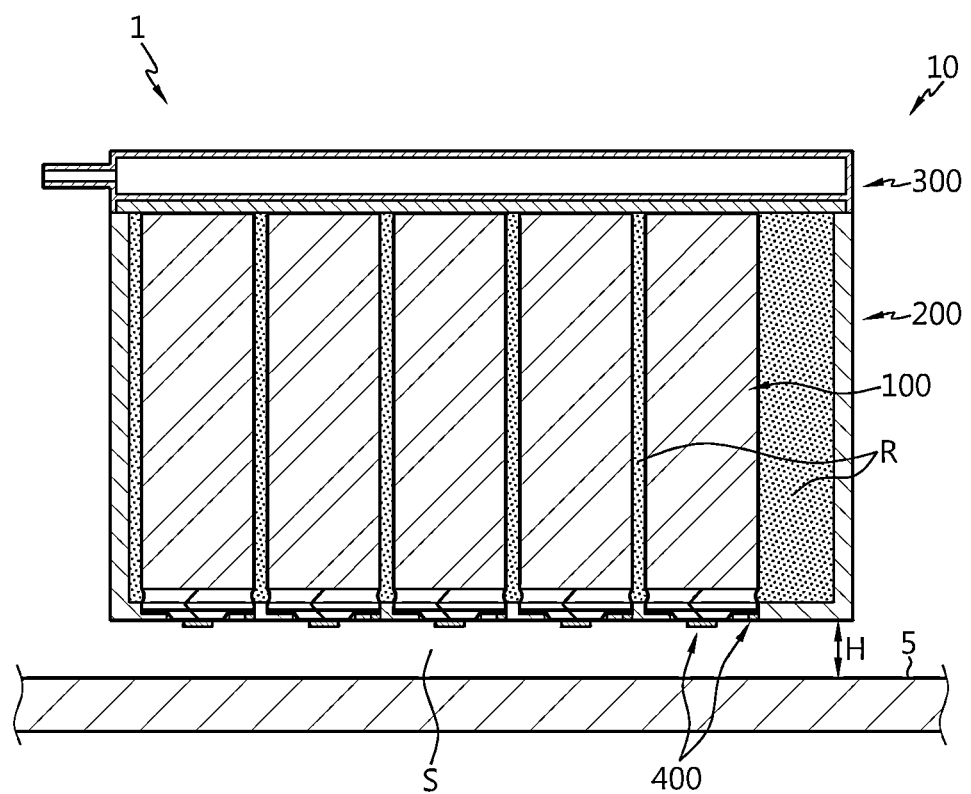
FIG. 1 is a diagram illustrating a battery pack mounted in a vehicle according to an embodiment of the present disclosure.

FIG. 1 is a diagram illustrating a battery pack mounted in a vehicle according to an embodiment of the present disclosure.

Referring to FIG. 1, the vehicle 1 may be an electric vehicle or a hybrid electric vehicle, and may include at least one battery pack 10. In the vehicle 1, a seating space having an interior sheet for a driver and passengers may be provided above the at least one battery pack 10, and an under body frame 5 of the vehicle 1 may be provided below the battery pack 10.

The battery pack 10 may be spaced a predetermined height H apart from the under body frame 5 provided at the lower part of the vehicle 1. The battery pack 10 is spaced the predetermined height H apart to form a safety space S, and hereinafter, the related placement structure of the battery pack 10 and its entire configuration will be described in more detail with reference to the related drawings.

Figure 2:
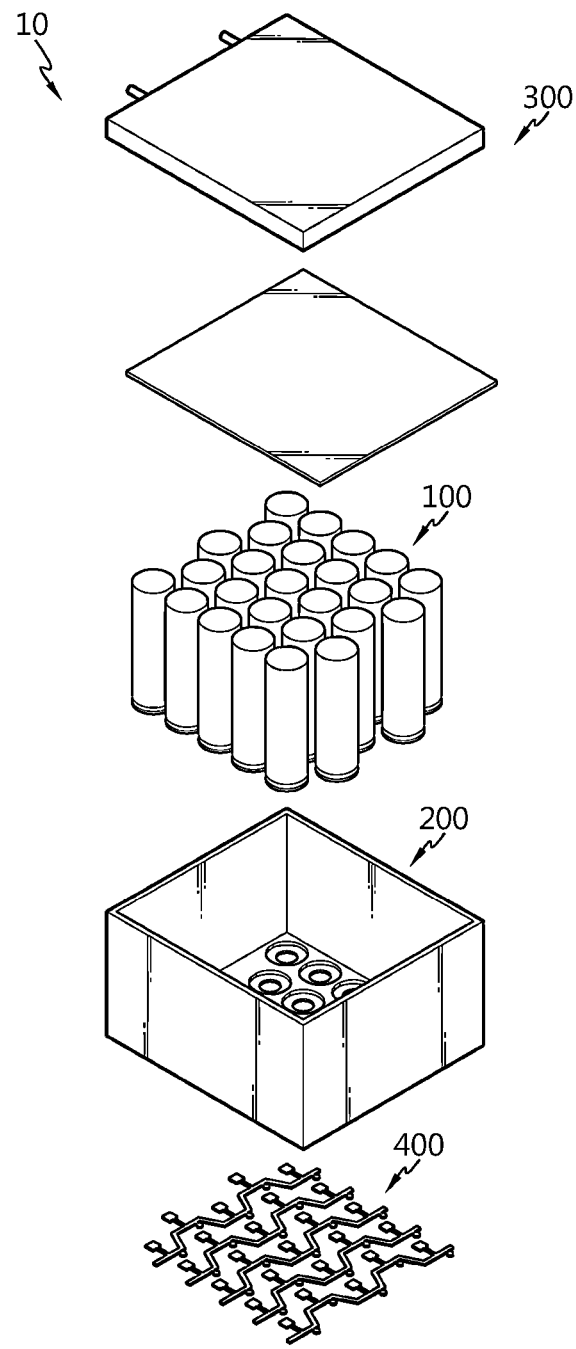
FIG. 2 is an exploded perspective view of the battery pack of FIG. 1.

FIG. 2 is an exploded perspective view of the battery pack of FIG. 1.

Referring to FIG. 2, the battery pack 10 may include a battery cell 100 and a pack case 200. Meanwhile, the battery pack 10 may further include a pack cover 300, a busbar unit 400 and various types of electrical components that constitute the battery pack 10.

The battery cell 100 may be a secondary battery, for example, a cylindrical secondary battery, a pouch-type secondary battery or a prismatic secondary battery. Hereinafter, this embodiment is described based on a cylindrical secondary battery as the battery cell 100.

At least one battery cell 100 may be provided. Hereinafter, this embodiment is described based on a plurality of battery cells 100.

Hereinafter, the plurality of battery cells 100 will be described in more detail.

Figure 3:
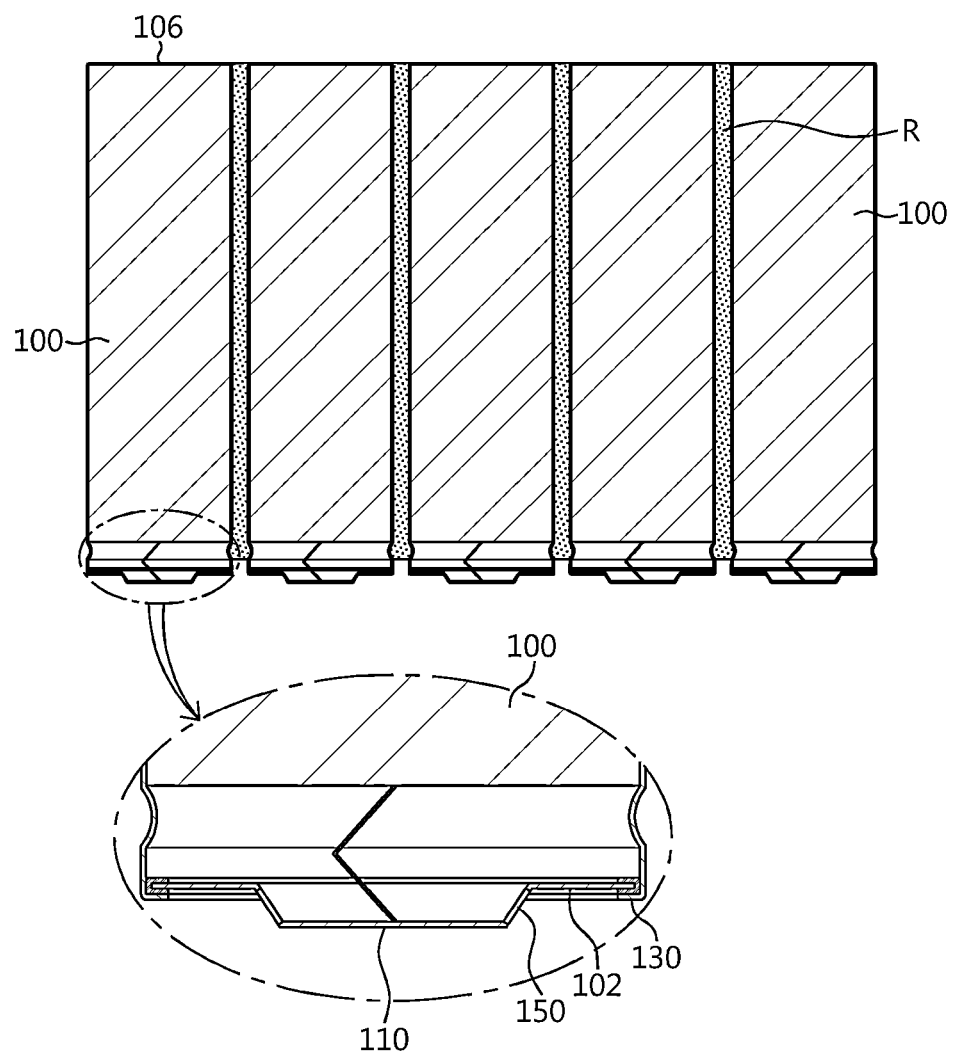
FIG. 3 is a diagram illustrating battery cells of the battery pack of FIG. 2.

FIG. 3 is a diagram illustrating the battery cells of the battery pack of FIG. 2.

Referring to FIG. 3, a resin material R may be filled between the plurality of battery cells 100. The resin material R may fix the plurality of battery cells 100 more stably and transfer heat generated from the plurality of battery cells 100 more uniformly, thereby increasing the cooling performance of the plurality of battery cells 100.

The resin material R may include a potting resin. The potting resin may be formed by injecting a thin resin material into the plurality of battery cells 100 and curing it. Here, the injection of the resin material R may be performed at room temperature of about 15° C. to 25° C. to prevent thermal damage of the plurality of battery cells 100.

Specifically, the resin material R may include a silicone resin. The resin material R is not limited thereto, and may include any resin material other than the silicone resin, capable of fixing the battery cells 100 and improving the heat transfer efficiency.

A positive electrode 110 and a negative electrode 130 for electrical connection of the battery cells 100 may be provided at a lower end 102 of the plurality of battery cells 100. Here, the positive electrode 110 may be provided at the center of the lower end 102 of the battery cell 100, and the negative electrode 130 may be provided at the edge of the lower end 102 of the battery cell 100. In the battery cell 100, the positive electrode 110 and the negative electrode 130 are not limited thereto and may be provided with any other placement structure such that they are insulated from each other.

The positive electrode 110 and the negative electrode 130 of the plurality of battery cells 100 may be electrically connected to the busbar unit 400 as described below on the lower side of the pack case 200 (see FIGS. 1 and 2).

A vent portion 150 may be provided at the lower end 102 of each of the plurality of battery cells 100 to force gas G (see FIG. 7) generated from each battery cell 100 out.

The vent portion 150 may be provided at the end 102 of the lengthwise direction of the battery cell 100. The end 102 of the battery cell 100 may be positioned below the pack case 200 (see FIGS. 1 and 2).

Specifically, the vent portion 150 may be provided at the lower end 102 of the battery cell 100, and may be positioned at the lower part of the pack case 200. More specifically, the vent portion 150 may be provided in a positive electrode plate area near the center of the lower end of the battery cell 100 having the positive electrode 110.

The vent portion 150 may be formed with a smaller thickness than any other area at the lower end 102 of the battery cell 100. The vent portion 150 ruptures to force the gas G (see FIG. 7) out of the battery cell 100 more easily when the internal pressure increases above a predetermined level due to an abnormal situation in the battery cell 100.

The vent portion 150 may be provided in the shape of an opening or notch of a predetermined size. Furthermore, the vent portion 150 may have a structure in which a film that ruptures above the predetermined level of pressure is added to the opening of the predetermined size.

In this embodiment, as the vent portion 150 is positioned at the lower part of the pack case 200, when an overheat or fire occurs due to an abnormal situation in the battery cell 100, gas or flame may move out through the lower side of the pack case 200, not the upper side of the pack case 200. Accordingly, when the abnormal situation occurs, it is possible to ensure safety of the driver and passengers of the vehicle 1 positioned above the pack case 200 to the maximum, thereby minimizing damage to the passengers.

The vent portion 150 may be provided near the center of the lower end 102 of the battery cell 100. The vent portion 150 is not limited thereto, and may be provided at any other location for forcing gas toward the lower part of the battery cell 100.

The upper end 106 of the plurality of battery cells 100 may be provided in a flat shape, and may be fixed to the lower surface of the pack cover 300 (see FIGS. 1 and 2). In this embodiment, since the positive electrode 110 and the negative electrode 130 are provided at the lower end 102 of the plurality of battery cells 100, as the upper end of the plurality of battery cells 100 is provided in a flat shape having no uneven structure, the upper end of all the plurality of battery cells 100 may be mounted in contact with the lower surface of the pack cover 300 without a predetermined gap space on the lower surface of the pack cover 300.

Here, the adhesive mounting of the plurality of battery cells 100 and the pack cover 300 may be accomplished through a thermally conductive adhesive. Meanwhile, the pack cover 300 may be provided as a heat sink to cool the battery cells 100 as described below.

In this embodiment, as the upper end of all the battery cells 100 is mounted in contact with the lower surface of the pack cover 300 without an uneven structure, it is possible to significantly increase the cooling performance of the battery cells 100.

Furthermore, in this embodiment, through the contact placement structure between the upper end 106 of the battery cells 100 and the pack cover 300, it is possible to reduce the total height of the vertical direction of the battery pack 10, thereby achieving a more compact structure of the battery pack 10 and significantly increasing the total energy density. Accordingly, in this embodiment, it is possible to mount the maximum number of battery packs 10 in the vehicle 1, thereby significantly increasing the total battery capacity of the vehicle 1.

Meanwhile, any other member such as a thermally conductive sheet may be interposed between the upper end 106 of the battery cells 100 and the pack cover 300 to increase the cooling performance. Furthermore, any other member such as a thermally conductive space having a groove structure for fixing the battery cells 100 more stably may be provided at the upper end 106 of the battery cells 100.

Figure 4:
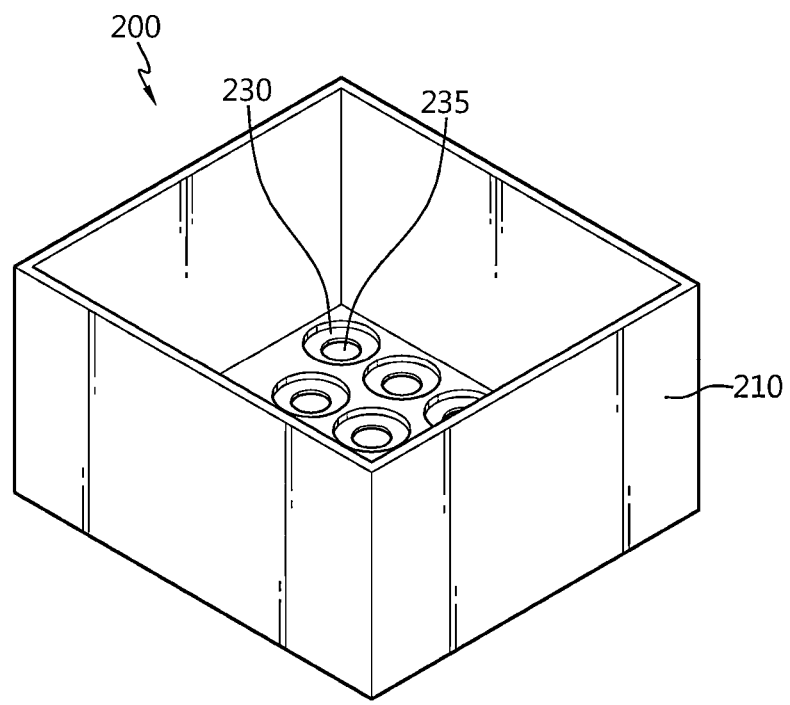
FIG. 4 is a diagram illustrating a pack case of the battery pack of FIG. 2.

FIG. 4 is a diagram illustrating the pack case of the battery pack of FIG. 2.

Referring to FIG. 4 together with FIGS. 1 and 2, the pack case 200 may accommodate the at least one battery cell 100. Specifically, the pack case 200 may accommodate the battery cells 100 such that the vent portion 150 of the battery cells 100 face the lower part of the battery pack 10, and may expose the vent portion 150 from the battery pack 10.

Furthermore, the lower surface of the pack case 200 may be spaced the predetermined height H apart from the under body frame 5 of the vehicle 1 to form the safety space S.

When an external impact occurs in the under body frame 5 of the vehicle 1, the safety space S may prevent the direct transfer of the external impact to the battery pack 10, thereby effectively preventing damage to the battery pack 10 caused by the external impact and further, explosion of the battery pack 10.

Furthermore, when an overheat or fire situation occurs due to an abnormal situation in the battery pack 10, the safety space S may guide gas or flame emitting from the battery cells 100 to move to the lower part of the vehicle 1, not the driver and passengers.

The inner space of the pack case 200 may be filled with the resin material R to cover the at least one battery cell 100, and in this embodiment, the plurality of battery cells 100. Specifically, the resin material R may be filled in the pack case 200 such that the battery cells 100 are submerged in at least part, so the resin material R may cover the plurality of battery cells 100.

The pack case 200 may include a case body 210 and a cell insertion portion 230.

The case body 210 may be coupled to the pack cover 300 as described below, to cover the at least one battery cell 100, and in this embodiment, the plurality of battery cells 100. The resin material R may be filled in the case body 210.

The cell insertion portion 230 may be provided on the bottom of the case body 210, and the end 102 of the at least one battery cell 100, and in this embodiment, the plurality of battery cells 100 may be inserted into the cell insertion portion 230. Specifically, a plurality of cell insertion portions 230 may be provided, and the lower end 102 of the plurality of battery cells 100 may be inserted into the plurality of cell insertion portions 230.

Each of the plurality of cell insertion portions 230 may have at least one opening 235 to accommodate the positive electrode 110 of the battery cells 100 and expose the vent portion 150 of the battery cells 100 from the pack case 200.

The at least one opening 235 may be sealed up with a thin film that may rupture by gas coming out of the vent portion 150. This is to prevent water filtration through the at least one opening 235.

Figure 5:
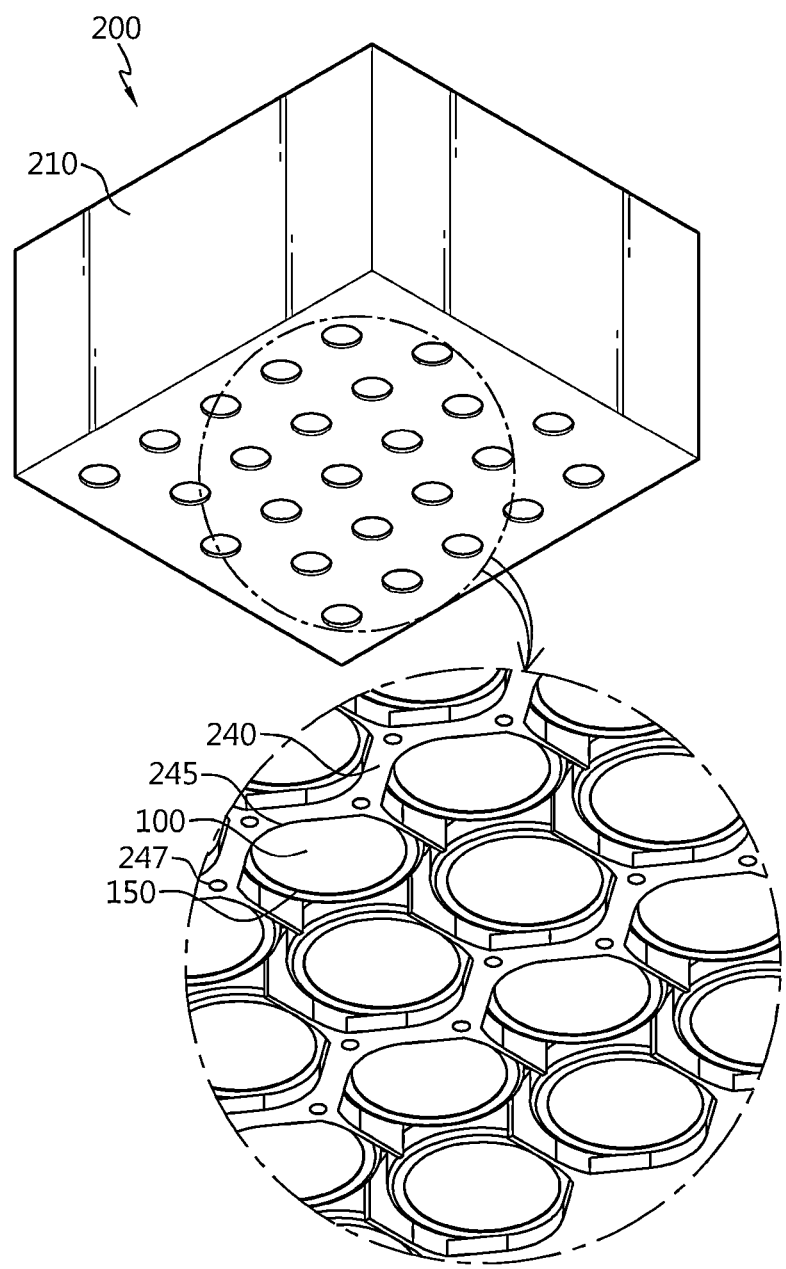
FIGS. 5 and 6 are diagrams illustrating a pack case according to another embodiment of the battery pack of FIG. 2.
Figure 6:
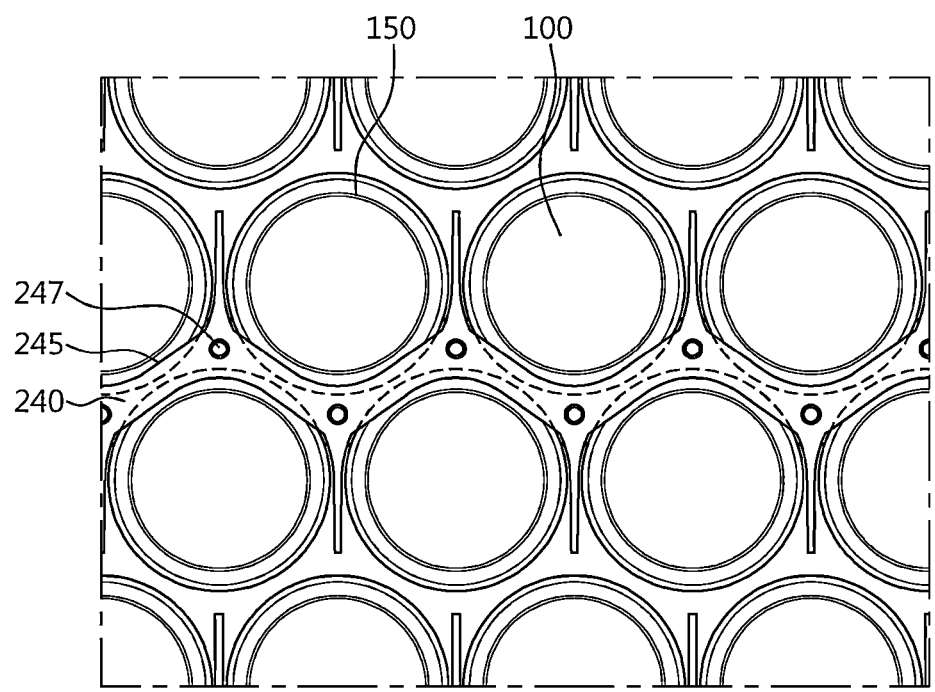

FIGS. 5 and 6 are diagrams illustrating a pack case according to another embodiment of the battery pack of FIG. 2.

Referring to FIGS. 5 and 6, a cell insertion portion 240 may be provided on the bottom of the case body 210. The cell insertion portion 240 may protrude to a predetermined height from the lower side of the pack case 200. Here, the cell insertion portion 240 may protrude downward from the pack case 200 more than the vent portion 150. The cell insertion portion 240 may form a protruding rib structure on the bottom of the pack case 200.

In this embodiment, it is possible to prevent the interference with the vent portion 150 of the battery cells 100 more effectively through the cell insertion portion 240 of the protruding rib structure, thereby forcing gas out more quickly without interference of the cell insertion portion 240 when forcing gas out through the vent portion 150 when the battery cells 100 are overheated.

Additionally, the cell insertion portion 240 may cover one side of the bottom of the at least one battery cell 100, and in this embodiment, the plurality of battery cells 100. Accordingly, the cell insertion portion 240 may fix at least one battery cell 100, and in this embodiment, the plurality of battery cells 100 more firmly.

Additionally, in the same way as the opening 235 of the previous embodiment, the cell insertion portion 240 may have an opening 245. Furthermore, the cell insertion portion 240 may have at least one fastening hole 247 through which a fastening member for coupling to the pack cover 300 passes or is fastened.

Figure 7:
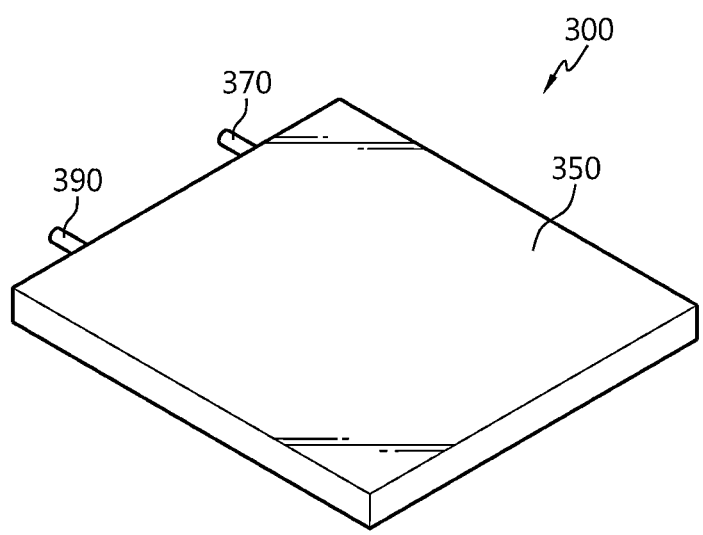
FIGS. 7 and 8 are diagrams illustrating a pack cover of the battery pack of FIG. 2.
Figure 8:
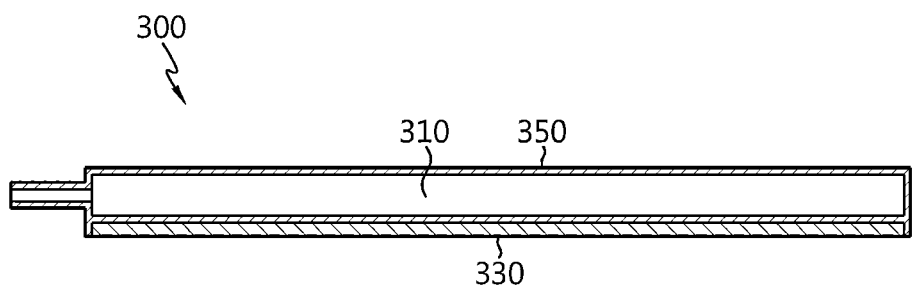

FIGS. 7 and 8 are diagrams illustrating the pack cover of the battery pack of FIG. 2.

Referring to FIGS. 7 and 8 together with FIGS. 1 and 2, the pack cover 300 may be coupled to the pack case 200, and may cover the at least one battery cell 100 on a side opposite to the vent portion 150. Specifically, the pack cover 300 may cover the opposite end 106 of the at least one battery cell 100. More specifically, the pack cover 300 may be coupled to the upper end of the pack case 200 and may cover the upper end 106 of the plurality of battery cells 200.

The pack cover 300 may include a cooling channel 310, a bottom heat sink 330, a top heat sink 350, a cooling water inlet port 370 and a cooling water outlet port 390.

The cooling channel 310 may be provided inside the pack cover 300 to cool the at least one battery cell 100, and in this embodiment, the plurality of battery cells 100. A cooling water for cooling the battery cells 100 may circulate in the cooling channel 310.

The bottom heat sink 330 may be positioned in contact with the at least one battery cell 100. In this embodiment, the bottom heat sink 330 may be positioned in contact with the opposite end 106 of the plurality of battery cells 100. Specifically, the bottom heat sink 330 may come into surface contact with the upper end 106 of the plurality of battery cells 100.

Furthermore, the at least one battery cell 100 may be fixed to the lower surface of the bottom heat sink 330. In this embodiment, the opposite end 106 of the plurality of battery cells 100 may be fixed to the lower surface of the bottom heat sink 330. Specifically, the upper end 106 of the plurality of battery cells 100 may be fixed to the lower surface of the bottom heat sink 330 through the thermally conductive adhesive.

As described above, in this embodiment, as the bottom heat sink 330 is fixed in surface contact with the upper end 106 of the battery cells 100, it is possible to improve the cooling performance of the battery cells 100 and guide the more stable mounting of the battery cells 100 in the pack case 200.

The top heat sink 350 may be coupled to the bottom heat sink 330 to form the cooling channel 310 inside. The top heat sink 350 may be coupled to the case body 210 of the pack case 200.

The cooling water inlet port 370 is used to guide the cooling water to the cooling channel 310, and may protrude from one side of the top heat sink 350, and may be connected in communication with the cooling unit.

Specifically, the cooling water inlet port 370 may protrude at a side of the side surface of the top heat sink 350. Accordingly, in this embodiment, it is possible to form a flat structure in the heightwise direction of the battery pack 10, thereby achieving a more compact structure of the battery pack 10.

The cooling water outlet port 390 is used to deliver the cooling water in the cooling channel 310 to the cooling unit, and may communicate with the cooling channel 310 and may be provided in the top heat sink 350, spaced apart from the cooling water inlet port 370.

Specifically, the cooling water outlet port 390 may protrude from a side of the side surface of the top heat sink 350, spaced a predetermined distance apart from the cooling water inlet port 370. Accordingly, in this embodiment, it is possible to form a flat structure in the heightwise direction of the battery pack 10, thereby achieving a more compact structure of the battery pack 10.

As described above, in this embodiment, as a heat sink structure for cooling the battery cells 100 is integrally formed in the top cover 300, it is possible to reduce the total size of the battery pack 10 and significantly increase the energy density of the battery pack 10, compared to the conventional heat sink structure provided separately from the top cover 300.

Additionally, in this embodiment, it is possible to increase the assembly process efficiency of the battery pack 10 and reduce the fabrication cost of the battery pack 10 through the integrated top cover 300 structure, thereby increasing the price competitiveness of the battery pack 10.

Referring back to FIG. 2, the busbar unit 400 is used for electrical connection of the plurality of battery cells 100, and may be provided below the pack case 200. The electrical connection may be a parallel and/or series connection. The busbar unit 400 may be electrically connected to the positive electrode 110 and the negative electrode 130 of the plurality of battery cells 100, and may be electrically connected to an external charge/discharge line through a connector.

In this embodiment, as both the positive electrode 110 and the negative electrode 130 of the plurality of battery cells 100 are provided on a side of the battery cells 100, to be specific, the lower side of the battery cells 100, it may be easier to make an electrical connection to the busbar unit 400.

That is, in this embodiment, with the structure in which the positive electrode 110 and the negative electrode 130 of the plurality of battery cells 100 are positioned in the same direction, it is possible to simplify the connection structure to the busbar unit 400 and reduce the occupied volume, compared to a structure which the positive electrode and the negative electrode are positioned in the opposite directions.

Accordingly, in this embodiment, it is possible to simplify the electrical connection structure of the busbar unit 400 and the battery cells 100, make the entire structure compact and improve the energy density.

Hereinafter, when an overheat or fire situation occurs in the battery pack 10 according to this embodiment, the mechanism to force gas out or ensure safety of the battery cell through the safety space S will be described in more detail.

Figure 9:
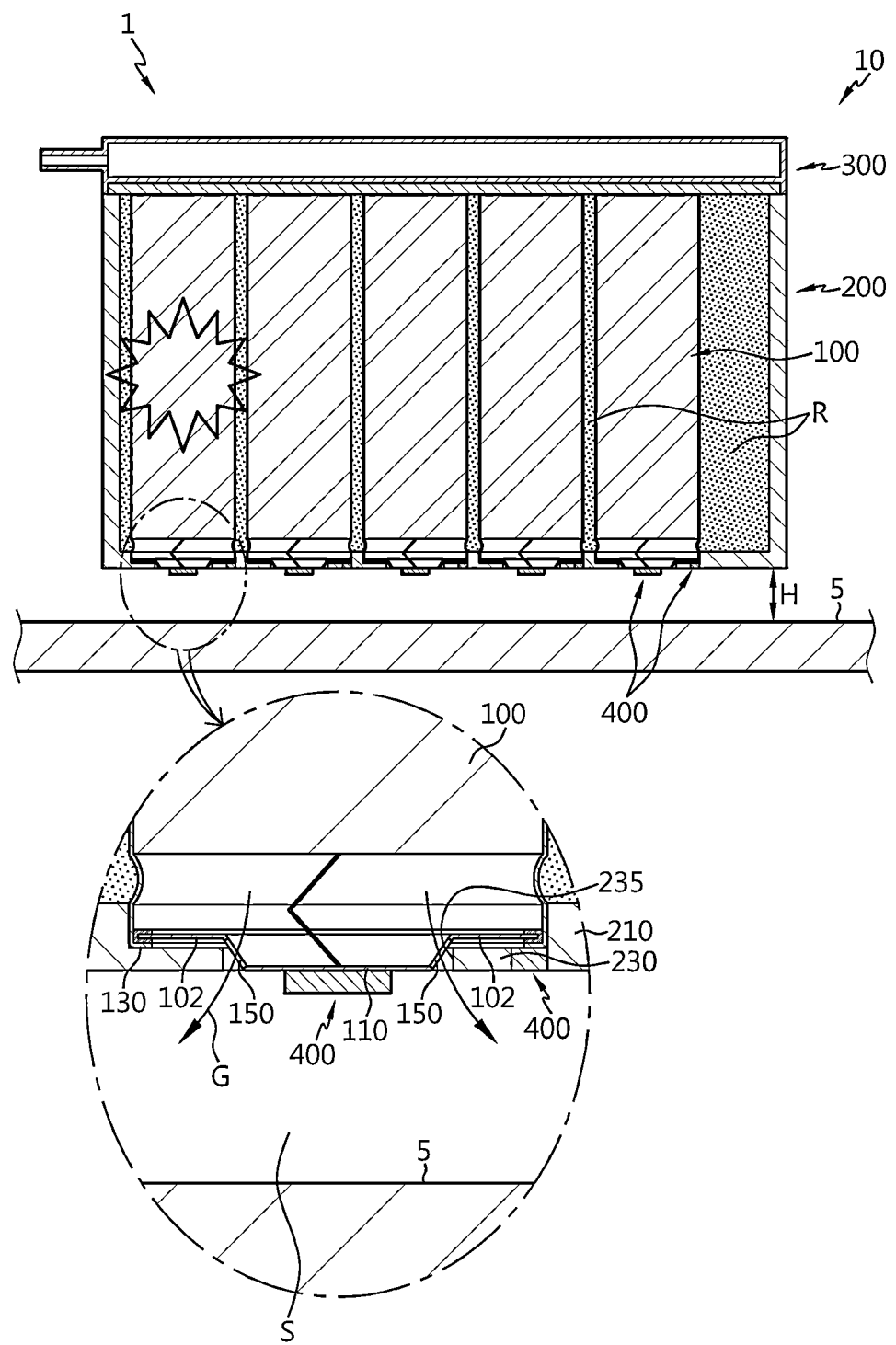
FIG. 9 is a diagram illustrating the gas release of a battery cell through a safety space when an overheat or fire situation occurs in a battery pack mounted in the vehicle of FIG. 1.

FIG. 9 is a diagram illustrating the gas release of the battery cell through the safety space when an overheat or fire situation occurs in the battery pack mounted in the vehicle of FIG. 1.

Referring to FIG. 9, gas G or flame may occur when at least one of the battery cells 100 of the battery pack 10 is overheated or catches fire due to an abnormal situation in the battery pack 10 of the vehicle 1.

In this embodiment, as the vent portion 150 of the battery cells 100 is positioned toward the lower side of the battery pack 10, the gas G released from the battery cells 100 through the vent portion 150 may be forced out downward from the pack case 200.

Specifically, the gas G generated from the battery cells 100 due to an abnormal situation may be guided to pass through the vent portion 150 positioned toward the lower side of the pack case 200 and move to the safety space S below the pack case 200 through the opening 235 of the cell insertion portion 230 of the pack case 200.

That is, in this embodiment, in case of a dangerous situation such as the overheat or fire situation, the gas G or flame is guided downward below the battery pack 10 at which the driver and passengers are located, not upward above the battery pack 10, thereby ensuring safety of the driver and passengers.

As described above, in this embodiment, the battery pack 10 has the safety space S on the under body frame 5 of the vehicle 1 to guide the release of the gas G and mitigate external impacts, thereby ensuring safety of the driver and passengers of the vehicle 1 when the above-described dangerous situation occurs. Accordingly, in this embodiment, it is possible to provide the battery pack 10 having higher safety performance when the battery pack 10 is mounted in the vehicle 1.

Figure 10:
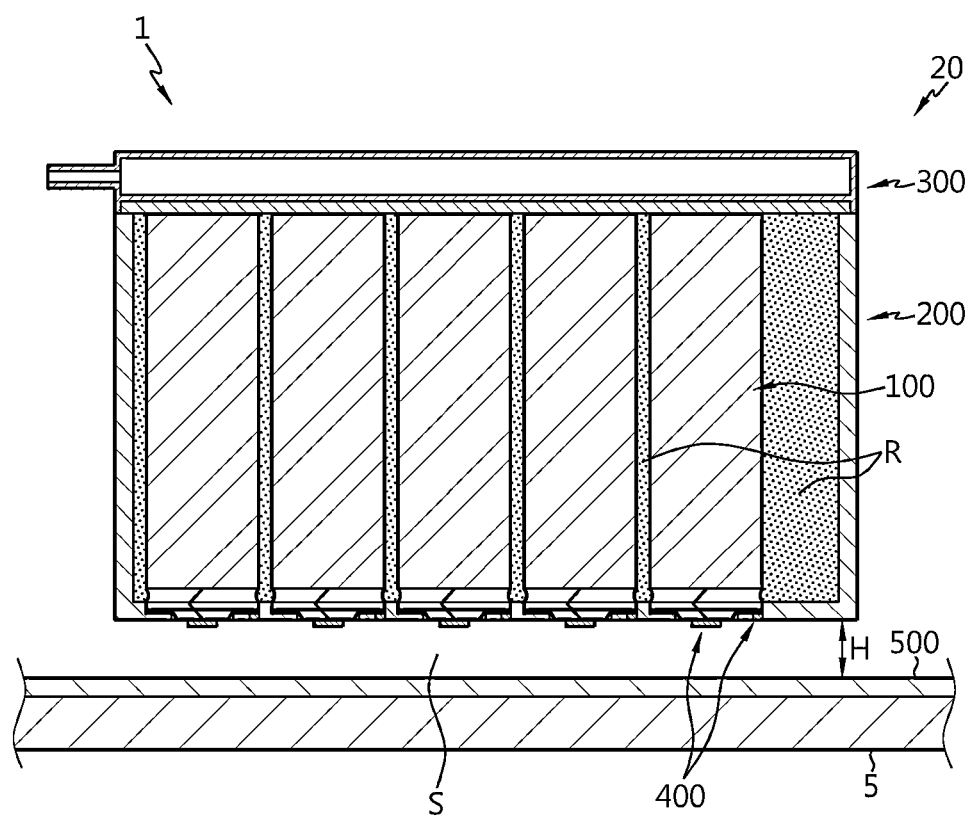
FIG. 10 is a diagram illustrating a battery pack according to another embodiment of the present disclosure.

FIG. 10 is a diagram illustrating a battery pack according to another embodiment of the present disclosure.

As the battery pack 20 according to this embodiment is similar to the battery pack 10 of the previous embodiment, an overlapping description of substantially identical or similar elements to the previous embodiment is omitted, and hereinafter, difference(s) between this embodiment and the previous embodiment will be described.

Referring to FIG. 10, the vehicle 1 may include the battery pack 20.

The battery pack 20 may include the battery cells 100, the pack case 200, the pack cover 300, the busbar unit 400 and a reinforcing plate 500.

The battery cells 100, the pack case 200, the pack cover 300 and the busbar unit 400 are substantially identical or similar to the previous embodiment, and hereinafter, an overlapping description is omitted.

The reinforcing plate 500 may be mounted in the under body frame 5 of the vehicle 1. The lower surface of the pack case 200 may be spaced the predetermined height H apart from the reinforcing plate 500 to form the safety space S.

In this embodiment, it is possible to increase the structure strength of the vehicle 1 through the reinforcing plate 500. Furthermore, in this embodiment, when an external impact occurs outside the under body frame 5 of the vehicle 1, it is possible to absorb and mitigate the external impact through the reinforcing plate 500 together with the under body frame 5, thereby minimizing the risk of impact transfer to the pack case 200 of the battery pack 10.

Additionally, in this embodiment, when flame caused by an abnormal situation in the battery cell 100 goes out below the pack case 200, the reinforcing plate 500 may mitigate the flame, thereby minimizing or delaying damage to the under body frame 5 to the maximum.

According to the various embodiments as described above, it is possible to provide the battery pack 10, 20 with a more compact structure and increased energy density and the vehicle 1 including the battery pack 10, 20.

Additionally, according to the various embodiments as described above, it is possible to provide the battery pack 10, 20 with improved safety performance and the vehicle 1 including the battery pack 10, 20.

While the preferred embodiment of the present disclosure has been hereinabove shown and described, the present disclosure is not limited to the above-described particular embodiment, and it is obvious to those skilled in the art that a variety of modifications may be made thereto without departing from the essence of the present disclosure claimed in the appended claims, and such modifications should not be individually understood from the technical aspect or scope of the present disclosure.

What is claimed is:

1. A battery pack for a vehicle, the battery pack comprising:
    a plurality of battery cells, each of which including a vent portion formed at one side thereof and configured to release gas when an internal pressure in the plurality of battery cells exceeds a predetermined level;
    a pack case accommodating the plurality of battery cells such that the vent portion faces a lower side of the battery pack and an under body frame of the vehicle; and
    a reinforcing plate,
    wherein the pack case includes a cell accommodating portion at a bottom of the pack case at which at least one battery cell of the plurality of battery cells is accommodated,
    wherein the cell accommodation portion has at least one opening through which the vent portion of the plurality of battery cells communicates with outside the pack case,
    wherein an inner space of the pack case is filled with a resin material to cover the plurality of battery cells, and
    wherein the reinforcing plate is spaced a predetermined height apart downward from a bottom outside surface of the pack case.

2. The battery pack according to claim 1, wherein the cell accommodation portion comprises a cell seating portion at a bottom inside surface of the pack case on which the at least one battery cell is disposed.

3. The battery pack according to claim 1, wherein the cell accommodation portion protrudes downward from the bottom outside surface of the pack case more than the vent portion of the plurality of battery cells.

4. The battery pack according to claim 1, wherein the cell accommodation portion forms a protruding rib structure at the bottom outside surface of the pack case, which protrudes downward from the bottom outside surface of the pack case.

5. The battery pack according to claim 1, further comprising:
    a pack cover coupled to the pack case and covering the plurality of battery cells on a side opposite to the one side at which the vent portion is formed.

6. The battery pack according to claim 5, wherein the pack cover has a cooling channel configured to cool the plurality of battery cells.

7. The battery pack according to claim 6, wherein the pack cover includes:
   a bottom heat sink positioned in contact with the plurality of battery cells; and
   a top heat sink including the cooling channel inside thereof and coupled to the bottom heat sink.

8. The battery pack according to claim 7, wherein the plurality of battery cells are fixed to a lower surface of the bottom heat sink.

9. The battery pack according to claim 8, wherein the pack cover includes:
   a cooling water inlet port in communication with the cooling channel, and protruding from a side of the top heat sink; and
   a cooling water outlet port protruding from the side of the top heat sink, spaced apart from the cooling water inlet port, and in communication with the cooling channel.

10. The battery pack according to claim 5, wherein the pack case includes a case body configured to accommodate the plurality of battery cells therein and to be coupled to the pack cover.

11. The battery pack according to claim 1, wherein the resin material is disposed between the plurality of battery cells.

12. The battery pack according to claim 1, wherein the one side of the each of the plurality of battery cells, at which the vent portion is formed, is one end of the each of the plurality of battery cells, and
   wherein, the one end of the each of the plurality of battery cells is arranged at the bottom of the pack case.

13. The battery pack according to claim 12, wherein the pack cover covers the opposite end of the each of the plurality of battery cells.

14. A vehicle comprising at least one battery pack according to claim 1.

15. The vehicle according to claim 14, wherein the bottom outside surface of the pack case is spaced a predetermined height apart from the under body frame of the vehicle.

16. The vehicle according to claim 15, wherein the reinforcing plate of the battery pack is mounted on the under body frame of the vehicle.

17. The vehicle according to claim 16, wherein the reinforcing plate is separate from the pack case.

18. The battery pack according to claim 1, wherein the resin material includes a potting resin.

* * * * *